United States Patent
Shibuya et al.

(10) Patent No.: US 10,645,765 B2
(45) Date of Patent: May 5, 2020

(54) COOKING DEVICE

(71) Applicant: Panasonic Intellectual Property Management Co., Ltd., Osaka (JP)

(72) Inventors: Masaki Shibuya, Osaka (JP); Akira Kataoka, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 15/518,350

(22) PCT Filed: Feb. 22, 2016

(86) PCT No.: PCT/JP2016/000918
§ 371 (c)(1),
(2) Date: Apr. 11, 2017

(87) PCT Pub. No.: WO2016/147563
PCT Pub. Date: Sep. 22, 2016

(65) Prior Publication Data
US 2017/0311394 A1    Oct. 26, 2017

(30) Foreign Application Priority Data
Mar. 19, 2015    (JP) .................................. 2015-055650

(51) Int. Cl.
*A47J 36/00*        (2006.01)
*A47J 36/02*        (2006.01)
(Continued)

(52) U.S. Cl.
CPC ............ *H05B 6/6479* (2013.01); *A47J 27/04* (2013.01); *A47J 36/027* (2013.01); *F24C 15/006* (2013.01);
(Continued)

(58) Field of Classification Search
CPC .......... H05B 6/6479; H05B 6/80; H05B 6/00; F24C 15/327; F24C 15/006; F24C 15/00; A47J 36/027; A47J 27/04; A47J 36/00
(Continued)

(56) References Cited

U.S. PATENT DOCUMENTS 4,426,923 A * 1/1984 Ohata .................... A47J 39/003
126/20
5,078,048 A * 1/1992 Yoshino ............... H05B 6/6458
219/707
(Continued)

FOREIGN PATENT DOCUMENTS

CN    101495804 A    7/2009
JP    2006-017404    1/2006
(Continued)

OTHER PUBLICATIONS

International Search Report of PCT application No. PCT/JP2016/000918 dated May 17, 2016.
(Continued)

*Primary Examiner* — Tu B Hoang
*Assistant Examiner* — Tiffany T Tran
(74) *Attorney, Agent, or Firm* — Brinks Gilson & Lione (57) ABSTRACT

Cooking device includes heating chamber with door for housing object to be heated, vapor generator for supplying vapor into heating chamber, and water storage tank. Cooking device further includes cooling air passage provided between heating chamber and water storage tank and allowing cooling air to pass therethrough, and air inlet provided to the side of door and introducing cooling air into cooling air passage. This enables cooling, using a smaller and more inexpensive cooling fan. As a result, cooking device is made shorter in overall height.

7 Claims, 6 Drawing Sheets

(51) Int. Cl.
  *H05B 6/64* (2006.01)
  *A47J 27/04* (2006.01)
  *F24C 15/32* (2006.01)
  *F24C 15/00* (2006.01)
  *H05B 6/80* (2006.01)
  *H05B 6/00* (2006.01)
(52) U.S. Cl.
  CPC ............ *F24C 15/327* (2013.01); *H05B 6/80* (2013.01); *A47J 36/00* (2013.01); *F24C 15/00* (2013.01); *H05B 6/00* (2013.01)
(58) Field of Classification Search
  USPC ....... 219/400, 401, 680, 681, 684, 678, 686, 219/705, 707, 710, 718, 757; 416/231, 416/233, 238, 241, 248, 243, 510, 511, 416/523; 99/330, 331, 451, 467, 99/473–476, 481
  See application file for complete search history.

(56) References Cited

U.S. PATENT DOCUMENTS

| | | | | |
|---|---|---|---|---|
| 5,549,038 | A * | 8/1996 | Kolvites | A47J 27/16 126/20 |
| 5,655,511 | A * | 8/1997 | Prabhu | F24C 15/006 126/19 R |
| 6,012,381 | A * | 1/2000 | Hawn | A47J 27/14 126/25 R |
| 8,539,941 | B2 * | 9/2013 | Iwamoto | H05B 6/642 126/198 |
| 2007/0181585 | A1 * | 8/2007 | Lane | A47J 41/0094 220/592.16 |
| 2008/0073338 | A1 | 3/2008 | Inada et al. | |
| 2009/0007798 | A1 * | 1/2009 | Yamaguchi | A21B 3/04 99/330 |
| 2010/0021146 | A1 * | 1/2010 | Murai | A21B 3/04 392/394 |
| 2011/0147376 | A1 * | 6/2011 | Ueda | F24C 15/327 219/682 |
| 2011/0215091 | A1 * | 9/2011 | Stanger | H05B 6/6479 219/682 |

FOREIGN PATENT DOCUMENTS

| | | |
|---|---|---|
| JP | 2011-047612 | 3/2011 |
| JP | 2014-052185 | 3/2014 |

OTHER PUBLICATIONS

English Translation of Chinese Search Report dated Aug. 2, 2018 for the related Chinese Patent Application No. 201680003806.3.

* cited by examiner

COOKING DEVICE

This application is a 371 application of PCT/JP2016/000918 having an international filing date of Feb. 22, 2016, which claims priority to JP 2015-055650 filed Mar. 19, 2015, the entire contents of which are incorporated herein by reference.

TECHNICAL FIELD

The present disclosure relates to cooking devices using vapor for cooking.

BACKGROUND ART

A conventional cooking device of this type includes a water tank disposed in a recessed part on a bottom plate, and an air inlet provided at the back of the water tank and introducing cooling air (e.g., PTL1).

CITATION LIST

Patent Literature

PTL1: Japanese Patent Unexamined Publication No. 2006-17404

SUMMARY OF INVENTION

In the above conventional cooking device, an air inlet is provided at the back of a water supply tank, and thus the water supply tank narrows a cooling air passage. This increases a pressure loss in the cooling air passage, which in turn decreases cooling efficiency. As a result, a large and high-power cooling fan is required.

In addition, to prevent deformation of the water supply tank made of resin by heat transferred from a heating chamber, a certain distance needs to be secured between the heating chamber and the water supply tank. This makes it difficult to design a cooking device shorter in overall height.

The present disclosure solves this disadvantage of the above prior art, and enables the use of a smaller and more inexpensive cooling fan. The present disclosure aims to offer a cooking device that is shorter in overall height.

An exemplary embodiment of the cooking device of the present disclosure includes a heating chamber with door for housing an object to be heated, a vapor generator for supplying vapor to the inside of the heating chamber, and a water storage tank. The cooking device in the exemplary embodiment further includes a cooling air passage which is provided between the heating chamber and the water storage tank and through which cooling air to passes, and an air inlet provided on the door side and introducing cooling air into the cooling air passage.

The exemplary embodiment suppresses a pressure loss in the cooling air passage to cool the inside of the cooking device with a smaller and more inexpensive cooling fan. As a result, the overall height of the cooking device can be made shorter.

DETAILED DESCRIPTION OF THE PREFERRED EMBODIMENTS

A cooking device in a first embodiment of the present disclosure includes a heating chamber with door for housing an object to be heated, a vapor generator for supplying vapor into the heating chamber, and a water storage tank. The cooking device in the embodiment further includes a cooling air passage which is provided between the heating chamber and the water storage tank and through which cooling air passes, and an air inlet provided on the door side and introducing cooling air into the cooling air passage.

This embodiment suppresses a pressure loss in the cooling air passage to cool the inside of the cooking device using a smaller and more inexpensive cooling fan. As a result, the overall height of the cooking device can be made shorter.

A cooking device in a second embodiment of the present disclosure includes a water supply tank in the water storage tank in the first embodiment. The water supply tank stores water to be supplied to the vapor generator.

This embodiment can prevent deformation of the water supply tank made of resin by cooling heat transferred from the vapor generator and the heating chamber, using cooling air passing between the water supply tank and the heating chamber. Accordingly, a distance between the water supply tank and the heating chamber can be reduced, compared to that in the prior art. As a result, the overall height of the cooking device can be made shorter than the prior art.

A cooking device in a third embodiment of the present disclosure includes a drain tank in the water storage tank in the first embodiment. The drain tank stores water discharged from the vapor generator.

This embodiment can prevent deformation of the drain tank made of resin by cooling heat transferred from the vapor generator and the heating chamber, using cooling air passing between the drain tank and the heating chamber. Accordingly, a distance between the drain tank and the heating chamber can be reduced, compared to that in the prior art. As a result, the overall height of the cooking device can be made shorter than the prior art.

A cooking device in a fourth embodiment of the present disclosure includes a water supply tank and a drain tank in the water storage tank in the first embodiment. The water supply tank stores water to be supplied to the vapor generator, and the drain tank stores water discharged from the vapor generator.

This embodiment can prevent deformation of the water storage tank made of resin by cooling heat transferred from the vapor generator and the heating chamber, using cooling air passing between both of the water supply tank and drain tank and the heating chamber. Accordingly, a distance between the water storage tank and the heating chamber can be reduced, compared to that in the prior art. As a result, the overall height of the cooking device can be made shorter than the prior art.

Still more, the embodiment suppresses ingress of water spilled from the water storage tank into the cooking device through the air inlet on attaching or detaching the water storage tank. As a result, internal electric components can be easily protected.

Furthermore, the embodiment enables to design a cooking device with water storage tanks with different capacities just by changing the height of the tank case and the water storage tank.

A cooking device in a fifth embodiment of the present disclosure has the cooling air passage between both of the water supply tank and drain tank and the heating chamber in the fourth embodiment.

This embodiment can protect the water supply tank and the drain tank from heat transferred from the vapor generator and the heating chamber by making cooling air from the air inlet pass above the entire top plates of the water supply tank and the drain tank. As a result, a distance between the water storage tank and the heating chamber can be reduced, compared to that in the prior art. As a result, the overall height of the cooking device can be made shorter than the prior art.

A cooking device in a sixth embodiment of the present disclosure has the vapor generator inside the cooling air passage in the first embodiment. This embodiment enables to easily cool the vapor generator.

An exemplary embodiment of the cooking device of the present disclosure is described below with reference to attached drawings. Same or equivalent components in the drawings may be given the same reference marks to omit duplicate description.

EXEMPLARY EMBODIMENT

Figure 1:
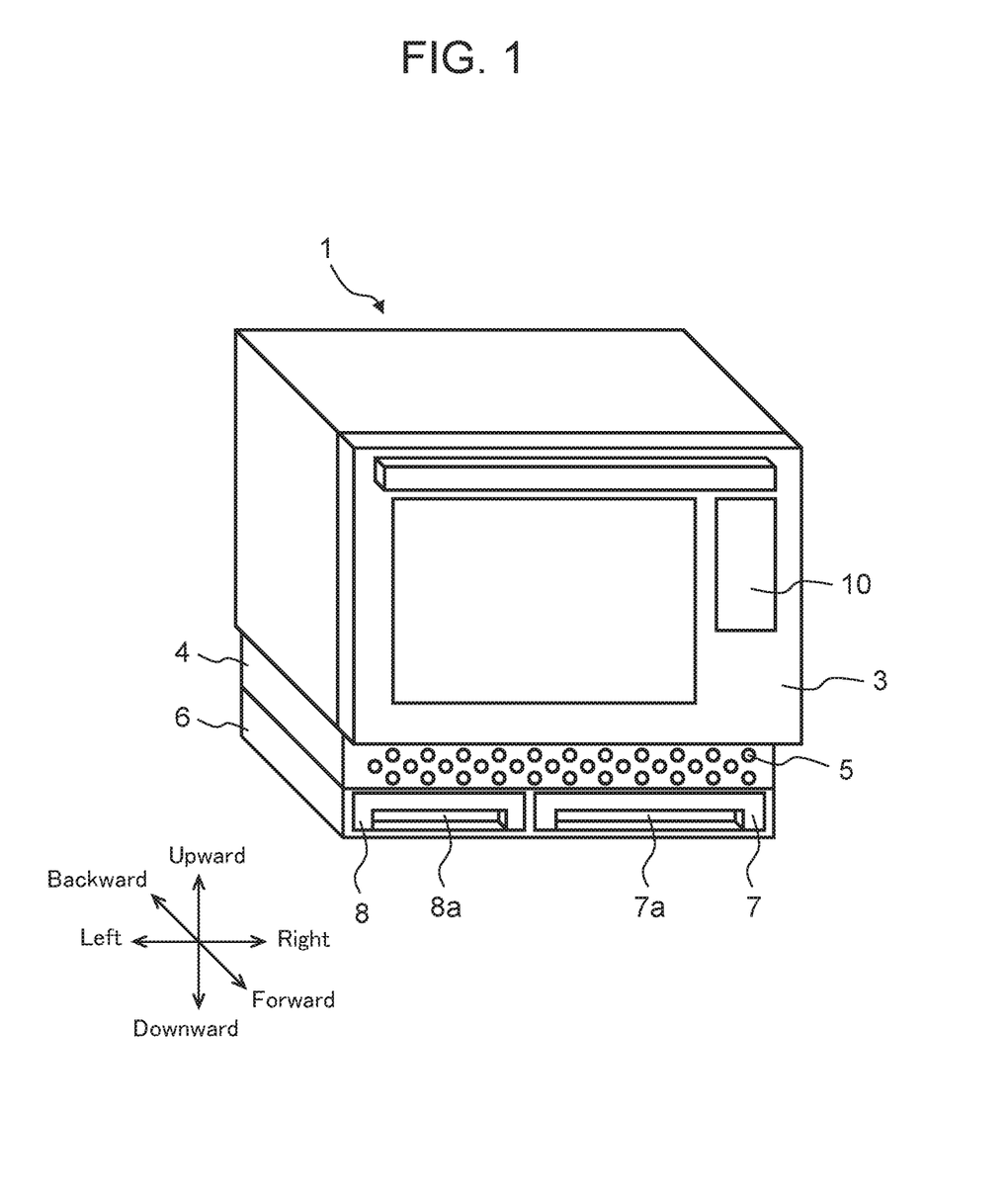
FIG. 1 is a perspective view of a cooking device in accordance with an exemplary embodiment of the present disclosure.

FIG. 1 is a perspective view of cooking device 1 in the exemplary embodiment of the present disclosure. In description below, front, back, left, and right of cooking device 1 are defined according to arrows indicated in FIG. 1.

As shown in FIG. 1, cooking device 1 includes an opening to which front door 3 is provided, and heating chamber 2 for housing food, which is an object to be heated, inside.

Bottom plate 4 is provided at the bottom of cooking device 1 to support heating chamber 2 from beneath. Tank case 6 is provided beneath bottom plate 4. Water supply tank 7 and drain tank 8, which are water storage tanks, are detachably housed like drawers in tank case 6 from the opening side of heating chamber 2.

Water supply tank 7 stores water to be supplied to vapor generator 20. Drain tank 8 stores water discharged from vapor generator 20. Water supply tank 7 and drain tank 8 are formed with transparent resin.

As show in FIG. 1, a face of tank case 6 to the side of door 3 is mostly occupied with water supply tank 7 and drain tank 8. Recessed handle 7a and handle 8a are provided on the front faces of water supply tank 7 and drain tank 8, respectively.

Tank case 6 is formed of transparent resin so that quantity of water in water supply tank 7 and drain tank 8 is visible.

Air inlet 5 for introducing cooling air is provided between the front faces of door 3 and water storage tank (water supply tank 7 and drain tank 8), i.e., the front face of bottom plate 4.

Door 3 is axially supported by a hinge (not illustrated) provided at its bottom so that door 3 is vertically openable centering on a rotating axis extending horizontally. Operation display 10 for setting cooking menus and cooking time by the user is provided on the front face of door 3.

Figure 2:
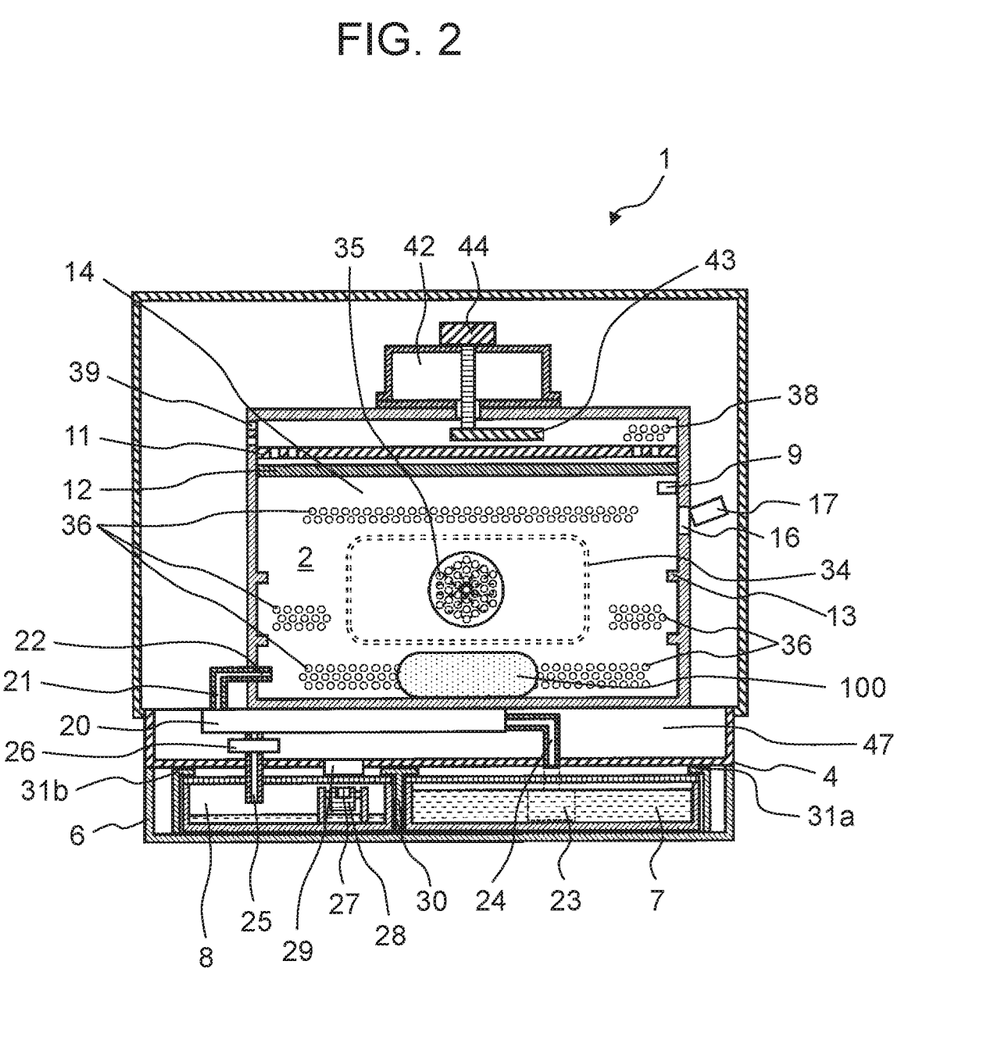
FIG. 2 is a front sectional view of the cooking device in accordance with the exemplary embodiment of the present disclosure.
Figure 3:
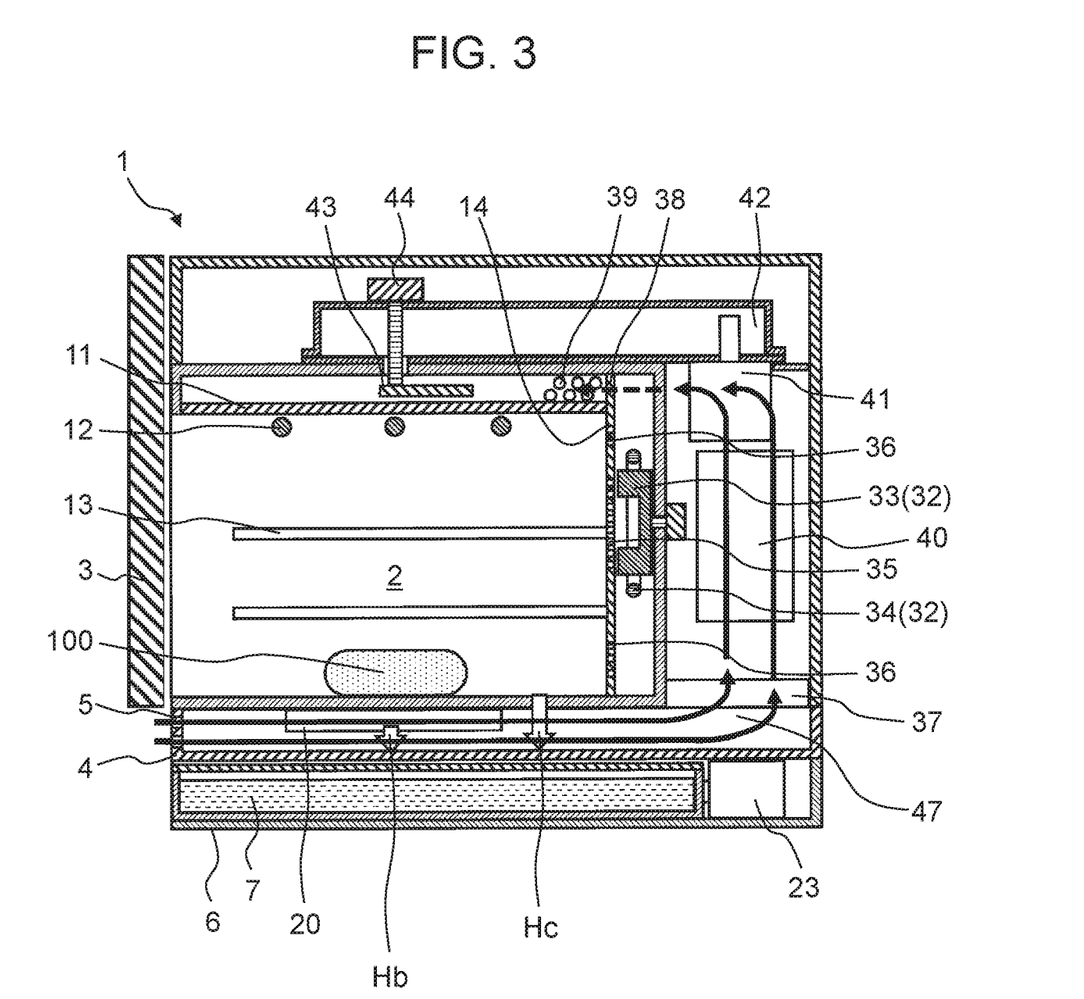
FIG. 3 is a side sectional view in the state a door of the cooking device is detached in the exemplary embodiment of the present disclosure.

FIG. 2 and FIG. 3 are a front sectional view and a side sectional view of cooking device 1 in the exemplary embodiment.

As shown in FIG. 2 and FIG. 3, top plate 11 made of mica and three radiation heaters 12 are provided at an upper part inside heating chamber 2. These three radiation heaters 12 are suspended from top plate 11, and extended horizontally parallel to each other. Radiation heaters 12 are one of heating units for heating food 100.

Rail 13 for supporting a removable cooking tray (not illustrated) is provided on right and left side walls of heating chamber 2. The inner walls of heating chamber 2, including top plate 11 and right and left side walls, are made of aluminized steel sheet whose surface is coated with fluorine.

In the exemplary embodiment, the inner walls of heating chamber 2 are coated with fluorine to facilitate wiping off of stains. However, the walls may also be enameled or coated with other heat-resistant agents. Stainless steel may also be used as a material for the inner walls of heating chamber 2.

Vent 38 for emitting air in heating chamber 2 is provided at the upper right part of partition wall 14, which is a rear wall of heating chamber 2. Vent 39 for introducing air into heating chamber 2 is provided at the upper part of the left wall of heating chamber 2. Vents 38 and 39 are configured with numerous punched holes.

Thermistor 9 and sensor hole 16 are further provided at the upper part of the right wall of heating chamber 2. Thermistor 9 detects an ambient temperature inside heating chamber 2. Infrared sensor 17 is installed on the outer wall of heating chamber 6, and detects temperature of food 100 and container inside heating chamber 2 through sensor hole 16.

Vapor generator 20 for generating vapor is provided below heating chamber 2. Vapor generated by vapor generator 20 passes through vapor passage 21 made of silicon, and is supplied into heating chamber 2 from jet nozzle 22 provided on the left wall of heating chamber 2.

In the exemplary embodiment, vapor passage 21 and jet nozzle 22 have a round cross-section, but they may also have an oval or rectangular cross-section. In addition, vapor passage 21 and jet nozzle 22 are provided on the left wall of heating chamber 2 in the exemplary embodiment, but they may be provided on the right wall or partition wall 14 of heating chamber 2.

The longest inner dimension of jet nozzle 22 is preferably not greater than ½ of wavelength of microwaves so that microwaves are not leaked. In the exemplary embodiment, since the wavelength of microwave is about 120 mm, the longest inner dimension of jet nozzle 22 is not greater than 60 mm.

Tank case 6, water supply tank 7, and drain tank 8 are provided below vapor generator 20. Vapor generator 20 is connected to water supply tank 7 via water supply pump 23 and water supply path 24.

One end of drain path 25 made of silicon is connected to vapor generator 20, and the other end is connected to drain tank 8. Drain valve 26 is installed in the middle of drain path 25. Drain valve 26 is closed in the initial state. When drain valve 26 is activated to open drain path 25, water inside vapor generator 20 is drained to drain tank 8.

In the exemplary embodiment, water supply tank 7 is disposed to the right and drain tank 8 is disposed to the left. However, the right and left positions may be opposite. Alternatively, they may also be disposed to the front and back.

Float 28 with magnet 27 at its top is provided in drain tank 8, and magnet sensor 29 is provided above float 28.

Tank case 6 includes partition 30 and tank guides 31a and 31b. Partition 30 is provided to separate between water supply tank 7 and drain tank 8. Tank guide 31a is provided above water supply tank 7 on both sides to function as a guide for drawer-type water supply tank 7. Tank guide 31b is provided above drain tank 8 on both sides to function as a guide for drawer-type drain tank 8.

Bottom plate 4 is supported by right and left side walls, rear wall, and partition 30 of tank case 6. In the exemplary embodiment, water supply tank 7 and drain tank 8 mostly occupy entire tank case 6. Partition 30 extends from the front center to back inside tank case 6 to prevent deformation of bottom plate 4 by the weight applied from above.

Partition 30 also functions as a guide for water supply tank 7 and drain tank 8, together with tank guides 31a and 31b. This enables to smoothly draw out water supply tank 7 and drain tank 8

In the exemplary embodiment, partition 30 is a wall for supporting bottom plate 4 and separating inside tank case 6. Instead of partition 30, for example, at least one column may be provided for supporting bottom plate 4 and separating inside tank case 6.

Cooking device 1 includes convection unit 32 at the back of heating chamber 2 in a space separated from heating chamber 2 by partition wall 14. Convection unit 32 is one of heating units for heating food 100.

Convection unit 32 is disposed at the back near the center of partition wall 14, and includes convection fan 33 and convection heater 34. Convection fan 33 circulates air between heating chamber 2 and convection unit 32. Convection heater 34 is provided around convection fan 33 for heating the air circulated.

Partition wall 14 includes vent 35 provided near its center and vent 36 provided around vent 35. Vent 35 and vent 36 are configured with numerous punched holes. Air inside heating chamber 2 is fed to convection unit 32 through vent 35. Air from convection unit 32 is fed to heating chamber 2 through vent 36.

A space that functions as cooling air passage 47 is provided below heating chamber 2 and vapor generator 20 and above water supply tank 7 and drain tank 8. In other words, vapor generator 20 is provided in cooling air passage 47. Cooling air passage 47 extends from underneath heating chamber 2 to the back of heating chamber 2 to carry cooling air to controller 40 and magnetron 41, which are described later.

As shown in FIG. 3, waveguide 42 made of aluminized steel sheet is installed above heating chamber 2. Magnetron 41 is disposed at the back of convection unit 32, and its antenna is inserted into waveguide 42.

Magnetron 41 is one of the heating units for heating food 100. Magnetron 41 generates microwaves and supplies them to waveguide 42. Waveguide 42 transmits microwaves generated by magnetron 41 to near the center of top plate 11.

Rotary antenna 43 made of aluminized steel sheet is installed above top plate 11 near its center. Motor 44 is installed above waveguide 42 and drives rotary antenna 43. Rotary antenna 43 driven by motor 44 stirs and irradiates microwaves into heating chamber 2.

Cooling fan 37 is disposed at the back of heating chamber 2 and in the midway of cooling air passage 47. Controller 40 is disposed on the downstream side of cooling fan 37 at the back of heating chamber 2 and in cooling air passage 47. Air inlet 5 is provided in front of cooling air passage 47.

Controller 40 controls magnetron 41, motor 44, convection fan 33, cooling fan 37, radiation heater 12, convection heater 34, thermistor 9, infrared sensor 17, water supply pump 23, and operation display 10, according to inputs from operation display 10.

During the heating operation of cooking device 1, cooling fan 37 activates to introduce external air to the inside through air inlet 5. The external air introduced as cooling air cools vapor generator 20, controller 40, magnetron 41, and so on in cooling air passage 47.

After cooling these electric components, cooling air enters heating chamber 2 through vent 39, passes through heating chamber 2, and is emitted outside through vent 38. The inside of heating chamber 2 is ventilated in this way.

In the exemplary embodiment, the front face of bottom plate 4, i.e., between door 3 and water storage tank (water supply tank 7 and drain tank 8), has air inlet 5 with punched holes in mostly uniform density. Accordingly, cooling air uniformly enters through air inlet 5 and passes above the entire top plates of water supply tank 7 and drain tank 8 so that water supply tank 7 and drain tank 8 are protected from heat Hb transferred from vapor generator 20 and heat Hc transferred from heating chamber (FIG. 3).

However, the present disclosure is not limited to this structure. Depending on positions to cool or prevent heat transfer, the position, density, area, and so on of air inlet 5 on the front face of bottom plate 4 may be changed. For example, if air inlet 5 has more holes to the left than to the right on the front face of bottom plate 4, cooling of vapor generator 20 can be reinforced.

In the exemplary embodiment, magnetron 41, waveguide 42, rotary antenna 43, and motor 44 are provided at the upper part of cooking device 1. However, they may also be provided at the lower part or side of cooking device 1.

Figure 4:
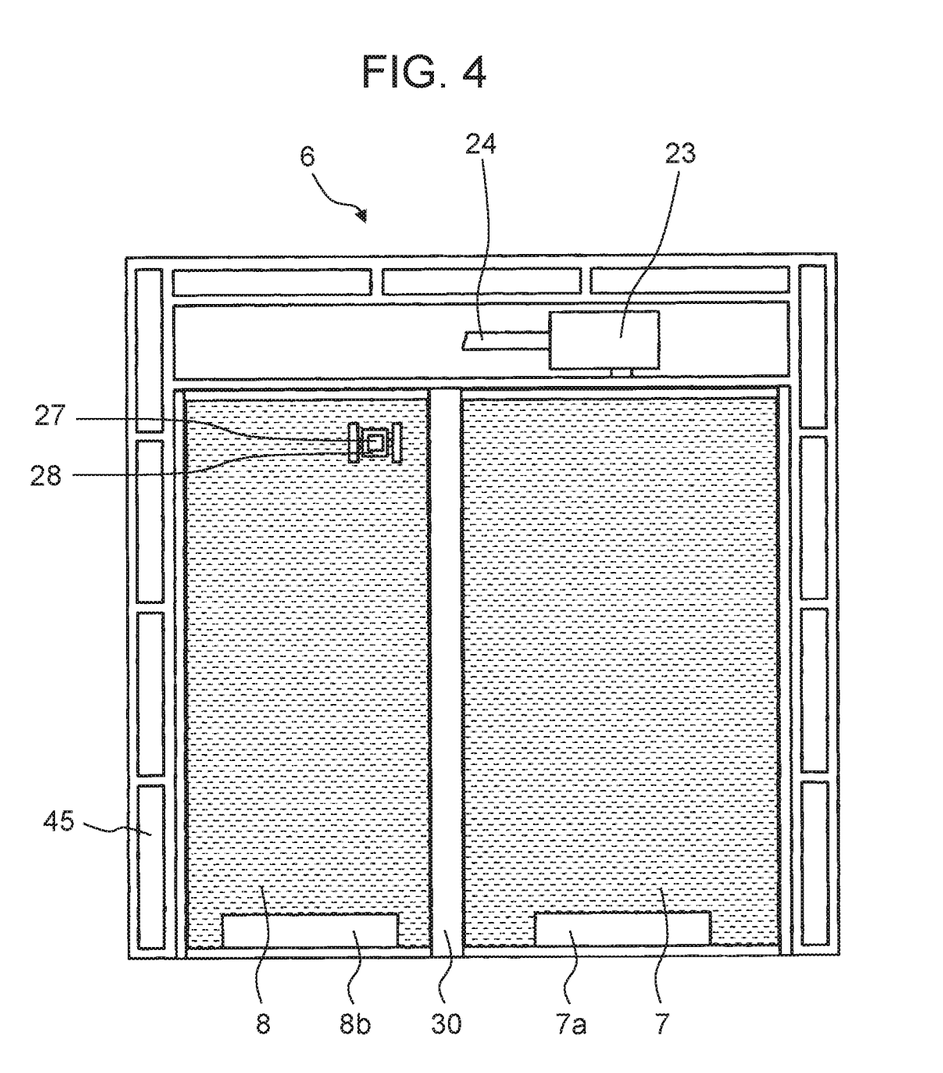
FIG. 4 is a plan view of a tank case in the cooking heater, and a water supply tank and a drain tank in the tank case in accordance with the exemplary embodiment of the present disclosure.

FIG. 4 is a plan view of tank case 6 and water supply tank 7 and drain tank 8 in tank case 6 of cooking device 1 in the exemplary embodiment. In FIG. 4, water supply tank 7 and drain tank 8 are indicated in the state their lids are removed.

As shown in FIG. 4, tank case 6 has tank case support 45 with multiple spaces separated by ribs on its periphery. Tank case support 45 supports bottom plate 4 and reinforces rigidity of tank case 6.

Water supply tank 7 and drain tank 8 occupy most of the area in tank case 6 except for a housing space for water supply pump 23 and tank case support 45. This enables to maximize the capacity of water supply tank 7 and drain tank 8.

Figure 5A:
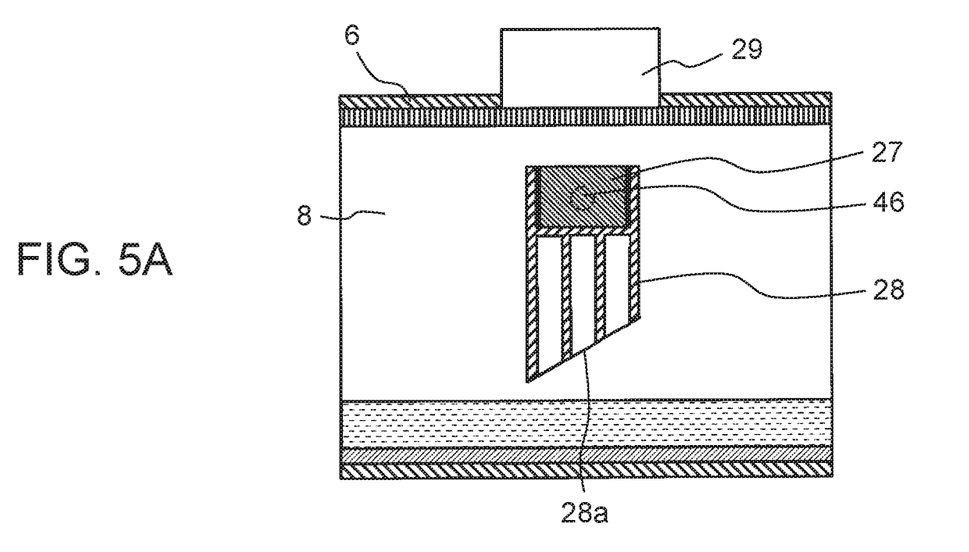
FIG. 5A is a side sectional view of the drain tank (when a water level is low) in the cooking device in accordance with the exemplary embodiment of the present disclosure.
Figure 5B:
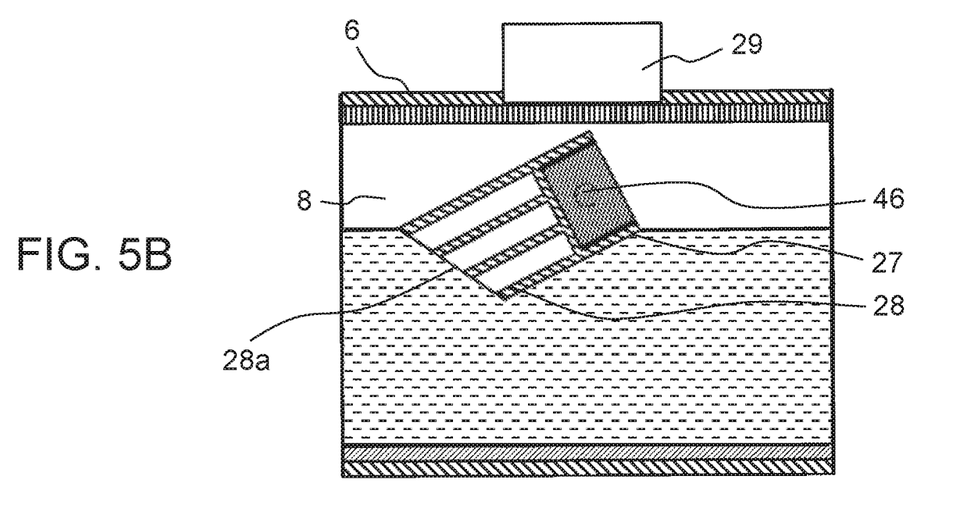
FIG. 5B is a side sectional view of the drain tank (when the water level is high) in the cooking device in accordance with the exemplary embodiment of the present disclosure.

FIG. 5A and FIG. 5B are side sectional views of drain tank 8 inserted to tank case 6 in cooking device 1 in the exemplary embodiment. FIG. 5A and FIG. 5B show the states when the water level in drain tank 8 is low and high, respectively.

As shown in FIG. 5A, float 28 includes float shaft 46 that rotatably installs float 28 onto tank case 6, and magnet 27 provided at the upper part of float 28. Magnet sensor 29 is placed on the top plate of tank case 6.

When the water level is low in drain tank 8, tip 28a of float 28 faces down almost vertically by the weight of float 28 itself. Controller 40 determines that the water level is low in drain tank 8 based on a magnetic force of magnet 27 detected by magnet sensor 29.

As shown in FIG. 5B, when the water level in drain tank 8 increases, float 28 rotates about float shaft 46 by its buoyancy, and magnet 27 moves away from magnet sensor 29. Controller 40 determines that drain tank 8 is full based on decreased magnet force detected by magnet sensor 29, and notifies of it to the user.

When drain tank 8 is removed from tank case 6 during cooking, controller 40 recognizes that drain tank 8 has been removed, and notifies of it to the user, based on magnet sensor 29 not detecting any magnetic force.

As shown in FIG. 5A and FIG. 5B, tip 28a of float 28 is obliquely formed with respect to a longer-hand direction of float 28. This shape makes tip 28a soaked in water from the left end, and applies buoyancy when fully soaked. As a result, float 28 rotates clockwise centering on float shaft 46, and floats.

If tip 28a of float 28 is formed perpendicular to the longer-hand direction, the rotating direction of float 28 in line with rising water level may not always be the same. In some cases, float 28 may not rotate at all, although the water level has risen, and the water level may not be detected. In this exemplary embodiment, obliquely-formed tip 28a always makes float 28 rotate clockwise in line with a rise of water level.

Figure 6:
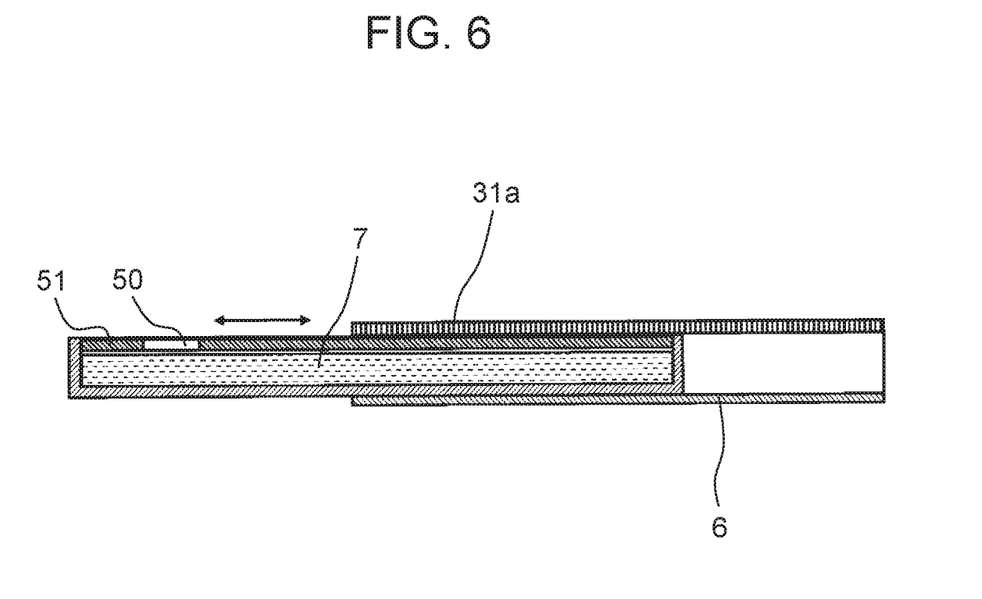
FIG. 6 is a side sectional view illustrating the state that the water supply tank is drawn out from the tank case in the cooking device in accordance with the exemplary embodiment of the present disclosure.

FIG. 6 is a side sectional view of water supply tank 7 of cooking device 1 in the exemplary embodiment in the state water supply tank 7 is drawn out from tank case 6.

As shown in FIG. 6, spout 50 for pouring water into water supply tank is provided on the front part of lid 51 covering the top of water supply tank 7. This enables to pour water into water supply tank 7 without completely drawing out water supply tank 7.

In the exemplary embodiment, tank guide 31a supports the top of water supply tank 7. This prevents water supply tank 7 from tilting or dropping due to the weight of water at pouring water after drawing out water supply tank 7.

The operation and effect of cooking device 1 as configured above is described below.

(Vapor-Heating)

First is described vapor-heating of cooking device 1 in the exemplary embodiment.

Before vapor-heating, the user inserts filled water supply tank 7 and empty drain tank 8 into tank case 6.

After placing food 100 and closing door 3, the user selects a cooking menu for vapor, using operation display 10, and starts vapor-heating.

According to the input to operation display 10, controller 40 operates vapor generator 20, water supply pump 23, and cooling fan 37. Water supply pump 23 supplies water in water supply tank 7 to vapor generator 20. Vapor generator 20 generates vapor by instantaneously evaporating supplied water with a heater provided inside. Vapor generator 20 may also gradually generate vapor by heating water stored inside.

Generated vapor is jetted out from jet nozzle 22 into heating chamber 2 via vapor passage 21. Dew condensation of vapor reaching food 100 occurs on the surface of food 100. Food 100 is heated by evaporation latent heat at this point. In particular, when food 100 is a food material with many hollows (e.g., noodle) or porous food, vapor enters into food 100 to enable efficient heating of food 100 from inside.

During vapor-heating, cooling fan 37 introduces cooling air from air inlet 5 into cooling air passage 47; and vapor generator 20, water supply tank 7, drain tank 8, and controller 40 are cooled by the cooling air.

When heating is completed, controller 40 activates drain valve 26 to open drain path 25, and discharges water inside vapor generator 20

When vapor-heating is consecutively implemented, vapor generator 20 may reuse hot water stored inside without draining it, in order to generate vapor quickly. Alternatively, drain path 25 may be opened according to instruction from the user. This can prevent overflow of water from drain tank 8 due to automated discharge in spite of water remaining in drain tank 8.

(Microwave-Heating)

Next is described microwave-heating of cooking device 1 in the exemplary embodiment.

After placing food 100 and closing door 3, the user selects a cooking menu for microwaves, using operation display 10, and starts microwave-heating.

Controller 40 activates magnetron 41. Microwaves emitted from magnetron 41 propagate in waveguide 42, and reach rotary antenna 43. Microwaves are irradiated into heating chamber 2 while stirred by rotary antenna 43 to heat food 100.

In the exemplary embodiment, microwave distribution inside heating chamber 2 can be changed by controlling the rotation of rotary antenna 43. This enables to select appropriate distribution performance according to type, shape, position and quantity of food 100.

During microwave-heating, cooling fan 37 introduces cooling air from air inlet 5 into cooling air passage 47, and magnetron 41 and controller 40 are cooled by the cooling air.

(Convection Heating)

Lastly, convection heating of cooking device 1 in the exemplary embodiment is described.

After placing a cooking tray (not illustrated) on rail 13, placing food 100 on the cooking tray, and closing door 3, the user selects a cooking menu for convection-heating, using operation display 10, and starts convection-heating.

Controller 40 activates convection unit 32. Convection fan 33 rotates to introduce air from heating chamber 2 to convection unit 32 through vent 35. Convention heater 34 heats the air introduced to generate hot air. The hot air returns to heating chamber 2 through vent 36. In this way, food 100 is heated by hot-air convection inside heating chamber 2.

During convection-heating, cooling fan 37 introduces cooling air from air inlet 5 into cooling air passage 47; and water supply tank 7 and drain tank 8 are protected from heat Hc (FIG. 3) transferred from heating chamber 2 by the cooling air. Then, the cooling air passing above water supply tank 7 and drain tank 8 cools controller 40. After completing convection-heating, cooling fan 37 continues to operate for a while.

Independent vapor-heating, microwave-heating, and oven-heating are described above. Still more, cooking device 1 allows grill-heating by radiation heater 12 and combined heating by microwaves and vapor. Furthermore, cooking heater 1 allows combined heating, using radiation heat by radiation heater 12 and hot air by convection heater 34 separately or simultaneously.

As described above, cooking device 1 in the exemplary embodiment includes cooling air passage 47 provided between heating chamber 2 and water storage tank (water supply tank 7 and drain tank 8) and allowing cooling air to pass therethrough. Cooking device 1 also includes air inlet 5 provided to the side of door 3 and introducing cooling air.

The exemplary embodiment enables to suppress a pressure loss in cooling air passage 47 to cool the inside of cooking device 1, using a smaller and more inexpensive cooling fan. As a result, the overall height of cooling heater 1 can be made shorter, compared to the prior art.

Still more, the exemplary embodiment can prevent deformation of a resin water storage tank by cooling heat Hb transferred from vapor generator 20 and heat Hc transferred from heating chamber 2, using cooling air passing between the storage tank (water supply tank 7 and drain tank 8) and heating chamber 2. Accordingly, a distance between the storage tank and heating chamber 2 can be reduced, compared to that in the prior art. As a result, the overall height of cooking device 1 can be made shorter than the prior art.

Still more, the exemplary embodiment suppresses ingress of water spilled from water supply tank 7 and drain tank 8 through air inlet 5 into cooking device 1 on attaching or detaching the water storage tank. As a result, electric components, such as controller 40 and magnetron 41, can be easily protected.

Still more, the exemplary embodiment can design cooking device 1 including water storage tanks with different capacities just by changing the height of tank case 6 and water storage tank.

Furthermore, the face of tank case 6 on the door 3 side is mostly occupied with water supply tank 7 and drain tank 8 in the exemplary embodiment. This enables to provide air inlet 5 on the entire front surface of bottom plate 4. As a result, a sufficient space can be secured for cooling air passage 47, and also large-capacity water supply tank 7 and drain tank 8 can be provided in tank case 6 without increasing the overall height of cooking device 1.

INDUSTRIAL APPLICABILITY

The present disclosure described above is typically applicable to microwave ovens, steamers, dishwasher and driers that employ a vapor generator.

What is claimed is:
1. A cooking device comprising:
a heating chamber having a door and configured to house an object to be heated;
a vapor generator disposed below the heating chamber and configured to supply vapor into the heating chamber;
a water storage tank located below the heating chamber and enclosed within a bottom plate which has a front panel, wherein the water storage tank includes a water supply tank and a drain tank, the water supply tank has a drawer-type and is configured to be drawn out;
a tank case comprising water supply tank guides, the water supply tank guides disposed above the water supply tank on both sides as a guide for the water supply tank being drawn out; and
a plurality of air inlets provided on said front panel,
wherein said front panel is disposed on a door side and recessed underneath said door, and said bottom plate is above the water storage tank and under the heating chamber to introduce outside cooling air into a cooling air passage which passes the cooling air between the heating chamber and the water storage tank which is located below the heating chamber.

2. The cooking device of claim 1, wherein the water storage tank includes the water supply tank for storing water to be supplied to the vapor generator.

3. Cooking device of claim 1, wherein the water storage tank includes the drain tank for storing water discharged from the vapor generator.

4. The cooking device of claim 1, wherein:
the water supply tank is configured for storing water to be supplied to the vapor generator, and
the drain tank is configured for storing water discharged from the vapor generator.

5. The cooking device of claim 4, wherein the cooling air passage is provided between both of the water supply tank and the drain tank and the heating chamber.

6. The cooking device of claim 1, wherein the vapor generator is disposed in the cooling air passage.

7. The cooking device of claim 1, wherein:
the water storage tank comprises a float rotatable along a float shaft, the float comprising a tip obliquely formed with respect to a longitudinal axis of the float.

* * * * *

UNITED STATES PATENT AND TRADEMARK OFFICE
CERTIFICATE OF CORRECTION

PATENT NO. : 10,645,765 B2
APPLICATION NO. : 15/518350
DATED : May 5, 2020
INVENTOR(S) : Masaki Shibuya et al.

Page 1 of 1

It is certified that error appears in the above-identified patent and that said Letters Patent is hereby corrected as shown below:

In the Claims

In Column 10, Claim 3, Line 24, delete "Cooking" and insert in its place --The cooking--.

Signed and Sealed this
Sixteenth Day of June, 2020

Andrei Iancu
*Director of the United States Patent and Trademark Office*